United States Patent Office 2,930,224
Patented Mar. 29, 1960

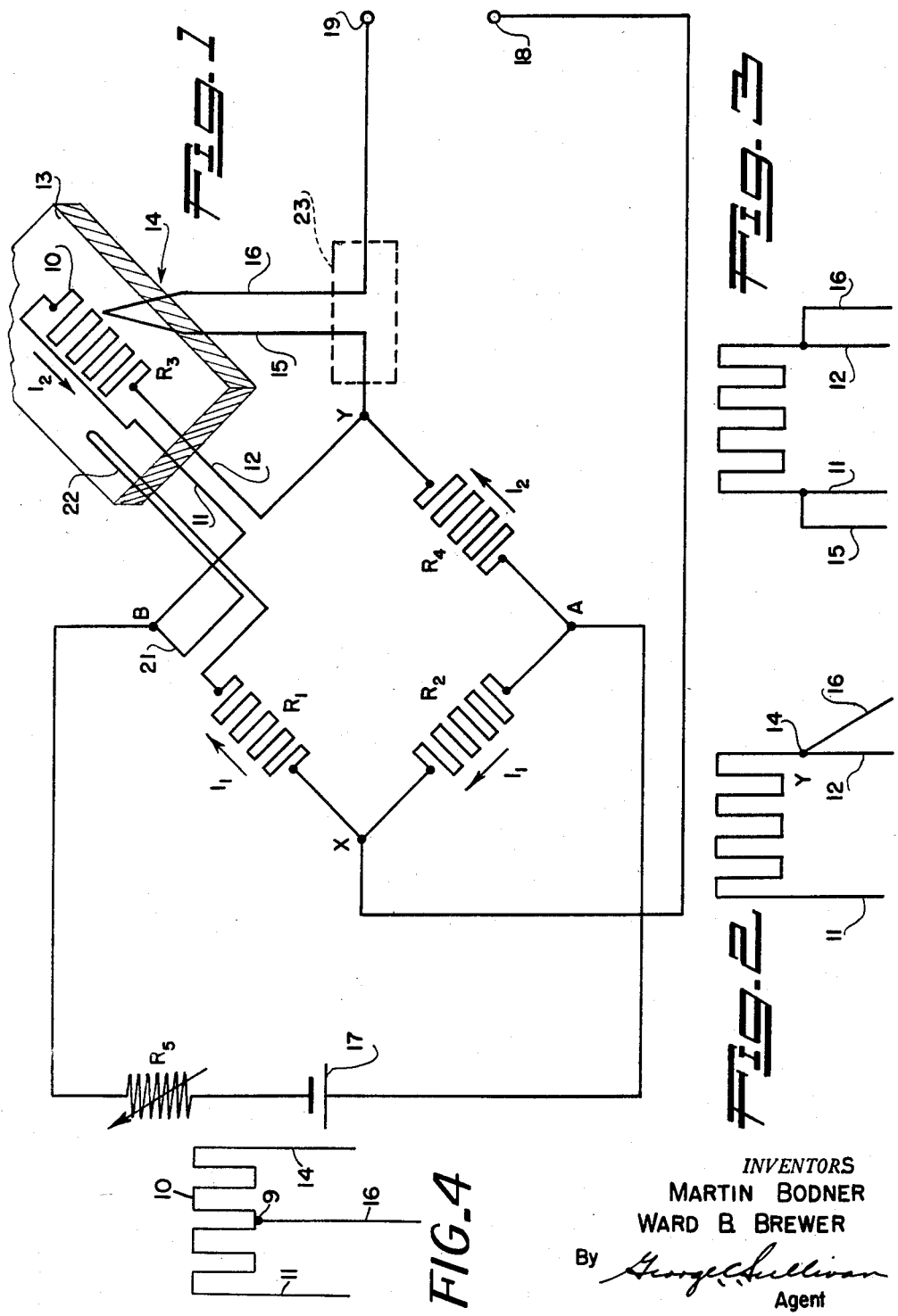

2,930,224

TEMPERATURE COMPENSATING STRAIN GAGE

Martin Bodner, Glendale, and Ward B. Brewer, Burbank, Calif., assignors to Lockheed Aircraft Corporation, Burbank, Calif.

Application October 22, 1956, Serial No. 617,391

9 Claims. (Cl. 73—88.5)

This invention relates to strain measuring and testing devices for generating electrical signals in response to applied stress and strain of a test member and more particularly, to an electrical strain gage which is temperature sensitive as well as sensitive to the stress and strain of the test member.

It has long been known that the electrical resistance of electrically conductive metals varies in accordance with certain functions of the strain to which they are subjected and this phenomenon, termed strain-sensitivity, has been employed in the so-called metal foil and wire-wound types of strain gages which generally employ a length or a plurality of series-connected parallel lengths of fine wire, known as a grid or filament, bonded by a suitable adhesive to the member to be stressed whereby the strain of the member is imparted to the wire. The resultant variation in the electrical resistance of the strain sensitive wire is usually measured by a Wheatstone bridge in which the strained wire constitutes one leg of the bridge. The bridge recording or indicating device, such as a galvanometer, may be conveniently calibrated to give a reading of strain in inches per inch which may be computed to provide stress in pounds per square inch.

Whenever a strain gage is bonded to a test member for the purpose of measuring the strain of the member due to varying load conditions, the overall strain reading may be affected adversely by what is commonly referred to as "apparent strain." Apparent strain may be defined as a strain indication generated in response to thermal expansion of the material engaged, the temperature resistance coefficient of the strain gage wire, and changes in strain gage lead wire resistance due to temperature variations. Naturally, apparent strain is undesirable since the strain reading will not represent a true conversion of stress and strain forces placed on the test member but will include expansion caused by variations in temperature.

One conventional method of temperature compensation is to employ a sensing strain gage made of specially selected wire materials which can be used on test members within a predetermined temperature range for which the gage materials have been selected. This method has proved applicable only for a limited temperature range and generally requires controlled test conditions. Another way of providing temperature compensation involves the employment of a "dummy gage" which is placed in close proximity to the sensing strain gage. The dummy gage is generally included in an adjacent leg of the Wheatstone bridge circuit so that a cancellation occurs when the resistance values and the temperature changes are at all times identical. However, because of temperature differences between the sensing strain gage and the dummy gage due to convective air currents for example, the resistances of the two gages are not equal and compensation for such transit temperatures cannot be readily obtained.

The present invention obviates the above difficulties by incorporating a temperature sensitive thermocouple with the sensing strain gage, which is not strain sensitive. The thermocouple has an electrical output which is substantially linear with respect to temperature and is coupled into the bridge circuit so that its generated current flow will be opposite to the current flowing in the sensing strain gage bridge leg and thereby that portion of the voltage generated by test member temperature in the sensing strain gage will be canceled by the voltage of opposite electrical polarity generated by the thermocouple. Both voltages will be of substantially equal magnitude since the sensing strain gage and thermocouple share the approximate temperature area.

Another feature of the present invention contemplates the use of a thermocouple not only for a temperature compensation arrangement but also to indicate test specimen temperature. For this arrangement, the thermocouple need not be incorporated into a bridge circuit but may be coupled directly to a thermal recording device.

Still another feature of the present invention is the cancellation of the voltage generated by the resistance change of the gage lead wires due to temperature. By placing the gage lead wires of an adjacent bridge leg in the immediate environment of the sensing strain gage lead wires, the resistances of both gage lead wires will vary whereby their combined variance will have substantially no affect on the null or balanced condition of the bridge circuit. In this manner, any voltage variance in the adjacent bridge leg due to temperature affecting the lead wires of this gage will be canceled, as far as unbalacing the bridge circuit is concerned, by substantially identical voltage variance in lead wires of the sensing strain gage due to temperature.

Another object of the present invention is to provide a three-lead temperature compensating and temperature sensitive gage. This feature is achieved by employing a thermocouple in combination with the sensing strain gage wherein one lead of the thermocouple and gage are common.

An additional feature of the present invention provides a temperature compensating strain gage wherein the cancellation effect takes place substantially simultaneously with temperature change in the test member having virtually no time lag.

Still another feature of the present invention is to provide a temperature compensating strain gage which is susceptible for use in multiaxial stress fields. The present methods respond slowly to temperature changes and are applicable only in uniaxial stress fields.

A further feature of the present invention is to provide a temperature compensating strain gage operable within a wide temperature range in the plus and minus temperature region.

In the accompanying drawing:

Figure 1 is a schematic view of a resistance strain gage bridge circuit showing means for temperature compensation in accordance with the present invention;

Figure 2 is a schematic view of a three-lead temperature compensating strain gage; and Figure 3 is a schematic view of another embodiment of the present invention; and Figure 4 is a schematic view of another embodiment of a three-lead temperature compensating strain gage.

Referring to Figure 1, an electrical bridge circuit is diagrammatically shown employing the present invention wherein $R_1$ and $R_2$ are fixed resistances comprising two legs of the bridge circuit while fixed resistance $R_4$ and resistance $R_3$ comprise the other two legs of the bridge circuit.

Inasmuch as $R_3$ represents the strain sensing gage, its resistance will vary according to applied stress and strain and cause the bridge to be unbalanced. The fixed resistances $R_1$, $R_2$ and $R_4$ are preferably conventional strain gages or resistors while $R_3$ represents the temperature compensating strain gage as contemplated by the present invention. This latter gage comprises a strain sensitive filament 10 having lead wires 11 and 12 connected to opposing ends of the filament 10. The filament may be of the foil gage type or may be formed of a continuous length of fine metal wire wound back and forth in a plurality of closely spaced, parlleled runs as shown in the drawing and firmly cemented in this form to a structural member 13 such as a web or flange of a beam in which it is desired to measure the strains or stresses under varying loading conditions. A number of sizes and types of strain-sensitive wires such as Nichrome, Copel, Constantan, and others may be employed.

The lead wires 11 and 12 through which electrical connections to filament 10 are made may be No. 30 cotton-covered copper wire and the filament and lead wires may be attached to one face of member 13 by suitably cementing the filament and lead wires and pressing them against the member.

A thermocouple formed by the juncture 14 of a pair of leads 15 and 16, being of metals or alloys thermoelectrically dissimilar to each other, is suitably placed in close proximity to filament 10. As the temperature present in an area surrounding juncture 14 varies with respect to the temperature present within reference area 23, a voltage is generated proportional to the temperature difference. Since the temperature substantially at juncture 14 causes apparent strain in member 13, the generated voltage may be said to represent the apparent strain of the member. One of the leads may, conveniently be of iron alloy or copper and the other of an alloy composed of Constantan, for example; these alloys having high thermoelectric power in combination. The diameter of the leads should be very small, preferably of the order of .010 inch.

Operating current for the circuit is supplied to the bridge at points A and B from a voltage source 17. The output of the bridge circuit is taken at points X and Y. When no strain is placed on member 13, the resistance in all legs of the bridge should be equal and therefore, no current will flow from the points X and Y; that is, there is no voltage difference between the points X and Y since the voltage at each point is the same.

The bridge circuit voltage supply provided by source 17 may be adjusted by variable resistance $R_5$ prior to applying loads on the test member so that the bridge output voltage caused by apparent strain is equal and opposite to the voltage generated by the thermocouple. The bridge output may be taken from terminals 18 and 19 since terminal 18 is coupled to point X of the bridge and terminal 19 is coupled to point Y via the leads 15 and 16 of the thermocouple.

In order to cancel the voltage generated by the resistance change of gage lead wires 11 and 12 due to temperature, a lead wire 21 associated with $R_1$ of an adjacent bridge leg is formed to provide a loop 22 and placed as close as practical to lead wires 11 and 12. Lead wire 21 is of substantially the same size and material as the sensing strain gage lead wires so that any voltage generated by resistance changes in lead wires 11 and 12 will be equally generated by resistance changes in lead wire 21, and thereby both voltages are balanced in the bridge circuit.

The total supply current divides at point A and flows into the legs of the bridge circuit forming current $I_1$, through $R_2$ and $R_1$ and current $I_2$ through $R_4$ and $R_3$. If there is no potential difference between points X and Y, the voltage drop across $R_3$ is equal to the voltage drop across $R_1$, $R_2$ and $R_4$, separately. However, as various load conditions are applied to test member 13, the resistance of $R_3$ varies which unbalances the bridge circuit and produces a potential difference between points X and Y and generates a signal voltage to an output recording device (not sown) connected to terminals 18 and 19. This signal voltage is modified by the voltage generated by thermocouple 14 which is opposite in electrical polarity to the signal voltage.

By employing the above arrangement of the present invention, a substantially accurate and true stress and strain signal voltage can be derived without any portion of this signal representing apparent strain.

Figure 2 shows a three-lead strain gage wherein lead 15 of the arrangement of Figure 1 is eliminated and lead 12 combines the function of a lead wire for the strain gage and the function of one lead of the thermocouple. This may be accomplished by attaching lead 16 of the thermocouple to lead wire 12 by means such as silver soldering. When employed in bridge circuit, lead wire 12 is coupled to $R_4$ of the bridge so that Y, representing bridge output, appears at juncture 14 forming the thermocouple. Terminal 19 is coupled to one end of lead wire 16 as in Figure 1. Preferably lead wire 12 is of copper and lead wire 16 is of Constantan so that proper thermoelectric action will take place. Copper is well suited for use in the three-lead strain gage since copper has a very low order of resistance which will not unbalance the bridge circuit voltage.

Figure 3 shows a four-lead temperature compensating strain gage wherein lead wires 15 and 16 are bonded to gage lead wires 11 and 12 by suitable means such as silver soldering. This arrangement offers precise temperature sensitivity in regard to both lead wires. It is to be understood that the thermocouple may be attached anywhere on the lead wires, filament or only maintained in close proximity to the gage.

Figure 4 shows a 3-lead strain gage employing the filament 10 and lead 16 which is shown joined thereto at 9. Lead 16 is made of dissimilar metal than the filament 10 and although shown connected to the midpoint of the filament 10, the thermocouple lead wire 16 may be attached anywhere along the filament. The electrical hook-up is identical to the circuit arrangement described in a previous paragraph.

Having described only typical forms of the invention we do not wish to be limited to the specific details herein set forth, but wish to reserve to ourselves any variations or modifications that may appear to those skilled in the art and fall within the scope of the following claims.

We claim:

1. An electrical arrangement for measuring strain in a body subjected to variable stresses and strains, including apparent strain comprising, a filament of electrical conductive material secured to the body; means coupled to the filament for generating an electrical signal through the filament of a given polarity in response to the variable stresses, strains and apparent strain; thermoelectric means arranged in close proximity to the filament for generating a second electrical signal of opposite polarity to the above signal and representing the apparent strain, and circuit means coupling the filament and thermoelectric means so that the first mentioned signal and the second mentioned signal combine to effect a strain responsive temperature compensated signal.

2. An electrical strain gage for measuring strain in a body subjected to variable stresses and strains comprising; a filament of electrical conductive material secured to the body; means coupled to the filament for generating an electric signal through the filament as a function of body strain; a bi-metal thermocouple comprising, the filament and a lead wire attached to the filament of dissimilar metal for generating an electrical signal as a function of filament environmental temperature; and circuit means coupling the lead wire and the filament to combine the first mentioned electric signal and the second mentioned electric signal to effect a strain responsive temperature compensated signal.

3. An electrical strain gage for measuring strain in a body subjected to variable stresses and strains comprising; a filament of electrical conductive material secured to the body; means coupled to the filament for generating a first electrical signal of a given polarity through the filament as a function of body strains; a bi-metal thermocouple comprising, the filament and a lead wire attached to the filament being of dissimilar metal for generating a second electrical signal of a polarity opposite to the first signal as a function of filament environmental temperature; and an additive circuit means coupled to the lead wire and the filament to combine the first and second electrical signals to effect a strain responsive temperature compensated signal.

4. An electrical arrangement for measuring strain in a body subjected to variable stresses, strains and apparent strain comprising; a filament of electrical conductive material secured to the body; means coupled to the filament for generating a first electrical signal through the filament in response to the variable stresses, strains and apparent strain; thermoelectric means arranged in close proximity to the filament and unbonded with respect to the filament and body for generating a second electrical signal in response to apparent strain; and means connecting the filament and thermoelectric means for combining the electric signals to cancel any signal representation of apparent strain.

5. An electrical arrangement for measuring deflection of a body subjected to variable stresses comprising, a transducer connected to the body for generating an electrical signal in response to the variable stresses; thermoelectric means arranged in close proximity to the transducer and physically separated from the transducer and body for generating an electrical signal proportional to transducer environmental temperature, and circuit means connecting the transducer and the thermoelectric means to combine the first and second above mentioned signals to effect a strain responsive temperature compensated signal.

6. An electrical signaling arrangement for measuring displacement and deflection of a body subjected to variable stresses comprising, a transducer affixed to the body for generating an electrical signal in response to displacement and deflection of the body, thermoelectric means arranged in close proximity to the transducer for generating an electrical signal proportional to transducer environmental temperature, and circuit means connecting the transducer and the thermoelectric means for combining the generated signals to effect a displacement responsive temperature compensated signal.

7. An electrical arrangement for measuring strain in a body subjected to variable stresses, strains and apparent strain comprising, a filament of electrical conductive material carried on the body, means coupled to the filament for generating an electrical signal through the filament, the electrical signal being varied in response to the variable stresses, strains and apparent strain applied to the filament via the body, thermoelectric means arranged in close proximity to the filament for generating a second electrical signal representing the apparent strain, and circuit means coupling the filament and thermoelectric means so that the combined signals from the filament and thermoelectric means effect a strain responsive temperature compensated signal.

8. An electrical strain gage for measuring strain in a body subjected to variable stresses and strains comprising; a filament of electrical conductive material secured to the body; a bi-metal thermocouple comprising, a first and a second lead wire of dissimilar metal attached to one end of the filament for generating an electrical signal as a function of filament environmental temperature; means coupled to the other end of the filament and to the first lead wire for generating an electrical signal as a function of body strain; and circuit means connected to the other end of the filament and said first lead wire, said first lead wire connecting said circuit means and said second lead wire, to combine the first mentioned electric signal and the second mentioned electric signal to effect a strain responsive temperature compensated signal.

9. A temperature compensated strain gage circuit comprising an impedance bridge network, a strain responsive impedance constituting a part of said network and thermoelectric means in close proximity to said impedance and electrically connected in series with the bridge output.

References Cited in the file of this patent
UNITED STATES PATENTS

| | | |
|---|---|---|
| 2,334,843 | Ruge | Nov. 23, 1943 |
| 2,344,642 | Ruge | Mar. 21, 1944 |
| 2,769,340 | Bernreuter et al. | Nov. 6, 1956 |
| 2,795,131 | Booth | June 11, 1957 |
| 2,801,388 | Ruge | July 30, 1957 |